United States Patent [19]

Yamada et al.

[11] Patent Number: 5,569,704
[45] Date of Patent: Oct. 29, 1996

[54] CURING AGENT AND A CATIONIC ELECTRODEPOSITION COATING COMPOSITION

[75] Inventors: Mitsuo Yamada, Suita; Yusaku Kobata, Higashiosaka, both of Japan

[73] Assignee: Nippon Paint Co., Ltd., Osaka, Japan

[21] Appl. No.: 392,171

[22] Filed: Feb. 22, 1995

[30] Foreign Application Priority Data

Feb. 22, 1994 [JP] Japan .................................... 6-049808

[51] Int. Cl.$^6$ ................ C08J 3/00; C08K 3/20; C08L 75/00
[52] U.S. Cl. .................... 524/591; 524/839; 524/840; 528/44; 528/45; 528/67
[58] Field of Search ..................... 524/591, 839, 524/840; 528/44, 45, 67

[56] References Cited

U.S. PATENT DOCUMENTS 4,605,690  8/1986  Debroy et al. .................... 523/414
4,748,200  5/1988  Nasu ................................... 524/840
5,214,086  5/1993  Mormile et al. ..................... 524/188

FOREIGN PATENT DOCUMENTS 531862  6/1992  European Pat. Off. .

OTHER PUBLICATIONS

Odian, G., Principles of Polymerization, 1981, p. 32.

Primary Examiner—Paul R. Michl
Assistant Examiner—Patrick Niland
Attorney, Agent, or Firm—Townsend & Banta

[57] ABSTRACT

The electrodeposition coating composition contains a base resin and a curing agent. The curing agent contains blocked isocyanate compound A and blocked isocyanate compound B. The difference in the glass transition temperatures of said blocked isocyanate compound A and said blocked isocyanate compound B is at least 25° C., and the glass transition temperature of said blocked isocyanate A is higher than the glass transition temperature of said blocked isocyanate B.

13 Claims, 1 Drawing Sheet

CURING AGENT AND A CATIONIC ELECTRODEPOSITION COATING COMPOSITION

BACKGROUND OF THE INVENTION

1. Field of the Invention

This invention relates to a curing agent and a coating composition, more specifically to a curing agent containing blocked isocyanate compounds and a cationic electrodeposition coating composition which contains it.

2. The Prior Art

A standard cationic electrodeposition coating composition contains a base resin and a curing agent. The curing agent used in such a coating composition is generally a blocked isocyanate compound.

FIG. 1 shows the relationship between the temperature of the electrodeposition bath and the film thickness in cationic electrodeposition painting. It is shown that, as the bath temperature rises, the film thickness first decreases and then increases. The temperature of the electrodeposition bath at which the film thickness is at a minimum is called "the minimum film -formation temperature (MFT)". Electrodeposition coating is conducted around this MFT. With conventional cationic electrodeposition paint which contains the curing agent as described above, the film thickness is significantly influenced by changes in the temperature of the electrodeposition bath around MFT, and therefore it is necessary to keep the temperature of the electrodeposition bath constant in order to obtain a constant film thickness.

BRIEF SUMMARY OF THE INVENTION

The object of this invention is to reduce the effect of the changes in the temperature of electrodeposition bath on the film thickness.

The curing agent according to this invention contains blocked isocyanate compound A and blocked isocyanate compound B. Here, the difference in the glass transition temperatures of the blocked isocyanate compound A and the blocked isocyanate compound B is at least 25° C. The glass transition temperature of the blocked isocyanate A is higher than that of the blocked isocyanate B.

Another curing agent according to this invention contains blocked isocyanate compound A with a glass transition temperature of 10°–45° C. and blocked isocyanate compound B with a glass transition temperature of –20° C.–0° C. Here, the difference in the glass transition temperatures of the blocked isocyanate compound A and the blocked isocyanate compound B is at least 25° C.

The cationic electrodeposition coating Composition according to this invention contains a base resin and a curing agent. The curing agent contains blocked isocyanate compound A and blocked isocyanate compound B. Here, the difference in the glass transition temperatures of the blocked isocyanate compound A and the blocked isocyanate compound B is at least 25° C. Also, the glass transition temperature of the blocked isocyanate A is higher than that of the blocked isocyanate B.

DETAILED DESCRIPTION

Curing agent

The curing agent of this invention contains blocked isocyanate compound A and blocked isocyanate compound B. Selection of the blocked isocyanate compounds A and B used in this invention is not particularly limited as long as they satisfy the relationships described below. In general, a blocked isocyanate compound comprises a part derived from an isocyanate compound and a part derived from an active hydrogen compound. There are many kinds of blocked isocyanate compounds obtained by combining various isocyanate compounds and various active hydrogen compounds.

In this invention, it is necessary to combine two blocked isocyanate compounds, A and B, with different glass transition temperatures. The blocked isocyanate compound A having a higher glass transition temperature compared with that of the blocked isocyanate compound B must be used.

The difference in the glass transition temperatures of the blocked isocyanate compound A and the blocked isocyanate compound B is at least 25° C., preferably 25°–60° C. If the difference in the glass transition temperatures is less than 25° C., then the film thickness is easily influenced by the changes in the temperature of the electrodeposition bath. If the difference in the glass transition temperatures is more than 60° C., then the function of a curing agent may not appear to be sufficient.

In this invention, the glass transition temperature is measured by a differential thermal analyzer.

For the glass transition temperature of each blocked isocyanate compound, 10°–45° C. is preferable for the blocked isocyanate compound A, and –20°–0° C. is preferable for the blocked isocyanate compound B. If they are outside of these ranges, then the general physical properties of the coating film may be poor when these compounds are used in a paint.

The difference in the solubility parameters of the blocked isocyanate compound A and the blocked isocyanate compound B is preferably 0.1–3.0, and more preferably 0.6–1.5. If it is outside of this range, then the effects of this invention may be harder to achieve. Between these blocked isocyanate compounds, it does not matter which compound has a larger or smaller solubility parameter. That is, the solubility parameter of the block isocyanate compound A can be either smaller or larger than that of the blocked isocyanate compound B.

The range of the solubility parameter of each blocked isocyanate compound is not particularly limited. However, 9.5–11.5 is preferable for the blocked isocyanate compound A, and 11.6–13.5 is preferable for the blocked isocyanate compound B.

The solubility parameter (SP) is determined according to the following equation (1) given by K. W. Suh and J. M. Corbett in Journal of Applied Polymer Science, 12, 2359 (1968).

$$SP=(V_{ml}^{1/2} \cdot \delta_{ml}+V_{mh}^{1/2} \cdot \delta_{mh})/(V_{mh}^{1/2}+V_{ml}^{1/2}) \tag{1}$$

In this equation, Vml is the volume of the low-SP solvent at the cloud point, Vmh is the volume of the high-SP solvent at the cloud point, δml is the solubility parameter of the low-SP solvent, and δmh is the solubility parameter of the high-SP solvent.

For the blocked isocyanate compounds A and B described above, various compounds obtained by blocking a polyisocyanate compound with active hydrogen can be used. For the polyisocyanate compound, both aromatic and aliphatic polyisocyanate compounds can be used. Therefore, there are four possible combinations of the blocked isocyanate compounds A and B as shown below:

1. A: Aromatic blocked isocyanate compound
   B: Aliphatic blocked isocyanate compound
2. A: Aromatic blocked isocyanate compound B: Aromatic blocked isocyanate compound 3. A: Aliphatic blocked isocyanate compound B: Aliphatic blocked isocyanate compound 4. A: Aliphatic blocked isocyanate compound B: Aromatic blocked isocyanate compound Of the combinations shown above, 1. is preferable because of design flexibility.

Furthermore, in order to minimize the heating loss, these polyisocyanate compounds should preferably contain an isocyanurate ring. In general, a polyisocyanate compound containing the isocyanurate ring is formed by a trimerization reaction of a diisocyanate compound. For example, in the case of aromatic polyisocyanate compounds, those which contain an isocyanurate ring derived from tolylenediisocyanate and/or diphenylmethanediisocyanate are preferable. In the case of aliphatic polyisocyanate compounds, those which contain an isocyanurate ring derived from hexamethylenediisocyanate are preferable. When using such polyisocyanate compounds containing an isocyanurate ring, the aromatic polyisocyanate compounds should preferably be blocked with lactams, glycol ethers or oximes, and the aliphatic polyisocyanate compounds should preferably be blocked with oximes, lactams or activated methylene compounds.

For the blend ratio of the aforementioned blocked isocyanate compound A and the blocked isocyanate compound B, a weight ratio (A/B) of 10/90–50/50 is preferable, and 15/85–40/60 is more preferable. If this ratio is outside of this range, then the thickness of the coating film of the electrodeposition coating composition containing the curing agent of this invention is easily to be influenced by changes in the temperature of the electrodeposition bath.

The curing agent of this invention is obtained by mixing the aforementioned blocked isocyanate compounds A and B with any mixing method.

Cationic electrodeposition paint

The curing agent described above can be used in a cationic electrodeposition paint.

the electrodeposition paint of this invention generally contains a base resin, curing agent, pigment, resin for dispersing the pigment, and solvent.

For the base resin, a resin with a number average molecular weight of 400–10,000, preferably 1,000–3,000, derived from bisphenol-type epoxy resins can be used. The base equivalent of the base resin can be in the normal range, specifically 40–150 (milli-equivalent/100 g), preferably 60–100 (milli-equivalent/100 g). The glass transition temperature of the base resin is preferably 40° C. or lower, more preferably 35° C. or lower. A resin with a glass transition temperature of 40° C. or higher has insufficient flowability when heated, and may reduce the flatness of the coating film.

Specific examples of the base resin are widely known in the industry including a compound obtained by a reaction between glycidyl ether of polyphenol and half-blocked diisocyanate followed by a ring opening reaction of an epoxy group using an amine compound. The most preferable for the base substrate resin is a modified epoxy resin which contains an oxazolidone ring in the molecule. This modified epoxy resin can be obtained by a reaction between an epoxy resin and a bis- or hetero-urathane compound derived from a diisocyanate compound.

For the curing agent, those described above according to this invention are used. The amount of this curing agent to be added is preferably determined according to the ratio of the curing agent and the base resin. Normally, the ratio (R/C) of the base resin (R) and the curing agent (C) is set at 90/10–50/50. If the ratio of the curing agent is less than 10, then a sufficient curing ability cannot be obtained. On the other hand, if it is over 50, then the heating loss may increase.

For the pigment, the resin to disperse the pigment and the solvent, those commonly used for cationic electrodeposition paints are used.

The cationic electrodeposition coating composition of this invention contains the curing agent described above and therefore the coating film thickness does not easily change when the temperature of electrodeposition bath changes.

As described above, the curing agent and the cationic electrodeposition coating composition of this invention reduces the influence of the changes in the temperature of electrodeposition bath on the film thickness.

EXAMPLE

Figure 1:
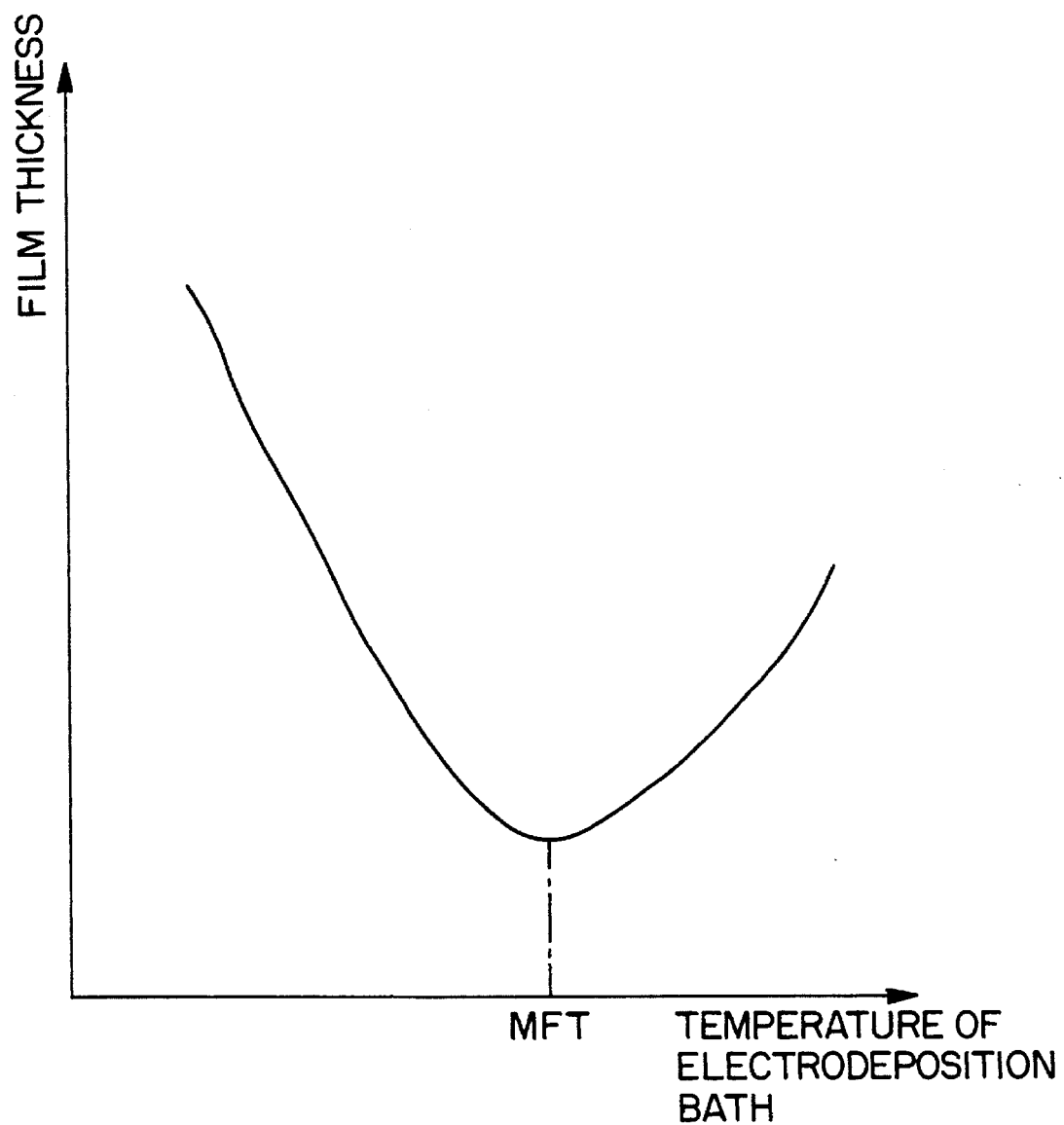
FIG. 1 is a graph showing the relationship between the temperature of electrodeposition bath and the film thickness in the cationic electrodeposition coating.

Synthesis example 1 (synthesis of base resin I)

A flask with a stirrer, a cooler, a nitrogen injection tube, a thermometer and a dripping funnel was used. 285.0 g of epoxy resin (epoxy-equivalent=475) derived from bisphenol A and epichlorohydrine, 380.0 g of epoxy resin with an epoxy-equivalent of 950, 77.0 g of p-nonylphenol and 82.4 g of methylisobutylketone were put into this flask and the temperature was raised to homogenize them. 3.0 g of benzyldimethylamine was added to this and the reaction was conducted at 130° C. until an epoxy-equivalent of 1140 was reached. The mixture was then cooled, and 19.2 g of diethanolamine, 27.0 g of N-methylethanolamine and 30.6 g of ketiminated aminoethylethanolamine (79 wt % in a methylisobutylketone solution) were added, followed by a 2-hour reaction at 110° C. The mixture was then diluted with methylisobutylketone until the non-volatile content was 90% to obtain base resin I with a glass transition temperature of 35° C. (as measured with a temperature rising rate of 10° C./min by using a thermal analyzer "model DSC-5200" manufactured by Seiko Electronics Industries Co., Ltd. )

Synthesis example 2 (synthesis of base resin II)

A flask with a stirrer, a cooler, a nitrogen injection tube, a thermometer and a dripping funnel was used. 92 g of 2,4-/2,6-tolylenediisocyanate (weight ratio=8/2), 95 g of methylisobutylketone and 0.5 g of dibutyltindilaurate were put into this flask and 21 g of methanol was dripped into the mixture as it was stirred. The reaction started at room temperature and the temperature rose to 60° C. due to heat generation. The reaction was then continued for 30 minutes and 57 g of ethylene glycol mono-2-ethylhexyl ether was dripped through the dripping funnel, followed by the addition of 42 g of bisphenol A-propyleneoxide 5 mol adduct. The reaction was conducted mainly in the temperature range of 60°–65° C., and continued while the IR spectrum was monitored until the isocyanate group disappeared.

Then 365 g of epoxy resin with an epoxy-equivalent of 188 synthesized from bisphenol A and epichlorohydrine was added and the temperature was raised to 125° C. After this, 1.0 g of benzylmethylamine was added and the reaction was conducted at 130° C. until the epoxy-equivalent reached 410. 87 g of bisphenol A was then added to the reaction vessel and the reaction was conducted at 120° C. to have an epoxy-equivalent of 1190. The mixture was then cooled, and 11 g of diethanolamine, 24.0 g of N-methylethanolamine and 25 g of ketiminated aminoethylethanolamine (79 wt % in a methylisobutylketone solution) were added, followed by a 2-hour reaction at 110° C. The mixture was then diluted with methylisobutylketone until the non-volatile content was 80% to obtain base resin II with a glass transition temperature of 22° C.

Synthesis example 3 (synthesis of base resin III)

A flask with a stirrer, a cooler, a nitrogen injection tube, a thermometer and a dripping funnel was used. 70 g of 2,4-/2,6-tolylenediisocyanate (weight ratio=8/2), 109 g of methylisobutylketone and 0.35 g of dibutyltindilaurate were put into this flask and 21 g of methanol was dripped into the mixture as it was being stirred. The reaction started at room temperature and the temperature rose to 60° C. due to heat generation. The reaction was then continued for 30 minutes and 47 g of ethylene glycol mono-2-ethylhexyl ether was dripped through the dripping funnel, followed by the addition of 42 g of bisphenol A-propyleneoxide 5 mol adduct. The reaction was conducted mainly in the temperature range of 60°–65° C., and continued while the IR spectrum was monitored until the isocyanate group disappeared.

Then 475 g of epoxy resin (epoxy-equivalent=475) derived from bisphenol F and epichlorohydrine was added and the temperature was raised, followed by homogenization. After this, 1.5 g of benzyldimethylamine was added and the reaction was conducted at 130° C. until the epoxy-equivalent reached 1140. The mixture was then cooled, and 11 g of diethanolamine, 25.0 g of N-methylethanolamine and 24 g of ketiminated aminoethylethanolamine (79 wt % in a methylisobutylketone solution) were added, followed by a 2-hour reaction at 110° C. The mixture was then diluted with methylisobutylketone until the non-volatile content was 90% to obtain base resin III with a glass transition temperature of 25° C.

Synthesis example 4 (preparation of the pigment-dispersing paste)

Bisphenol A-type epoxy resin with an epoxy-equivalent of 450 was reacted with 2-ethylhexanol half-blocked isophoronediisocyanate and the product was treated with tertialization of sulfide by using 1-(2-hydroxyethylthio)-2-propanol and dimethylolpropionic acid to obtain a resin varnish (with a ratio of tertialization of sulfide of 70.6% and a resin solid content of 60%) for dispersing pigments. 125.0 g of this resin varnish, 400.0 g of ion-exchanged water, 8.5 g of carbon black and 72.0 g of kaolin were dispersed using a sand grind mill, and the mixture was further grinded to have a particle size of 10 micrometers or less to obtain a pigment paste.

Synthesis example 5 (synthesis of blocked isocyanate compound a)

A flask with a stirrer, a cooler, a nitrogen injection tube, a thermometer and a dripping funnel was used. A methylisobutylketone solution of diphenylmethanediisocyanate trimer (product name "MC-708S" from Nippon Polyurethane Industry Co., Ltd.: NCO equivalent=230, solid content= 60%, residual monomer content=20%), the amount of which was 230 g as solid, and 22.8 g of ε-caprolactam were put into this flask. The contents of the flask were then heated up to 80° C. to dissolve them homogeneously. After adding homogeneously dissolved 0.183 g of dibutyltindilaurate and 0.183 g of 1,8-diazabicyclo(5,4,0)-7-undecene, 14 g of ethylene glycol monohexyl ether was dripped into the mixture while special attention was given to heat generation. After the dripping was completed, the temperature of the flask was kept at 80° C. and the reaction was continued until the NCO equivalent reached 380. 100 g of ethylene glycol monohexyl ether was then dripped through the dripping funnel over one hour. The reaction was continued until the absorption from the NCO group disappeared in the IR spectrum to obtain blocked isocyanate compound a. This blocked isocyanate compound had a non-volatile content of 70. 2% and a glass transition temperature of 31° C.

Synthesis examples 6–10 (synthesis of blocked isocyanate compounds b–f)

The raw materials, i.e. polyisocyanate compounds and active hydrogen compounds, were changed according to Table 1, and the same procedures as for Synthesis example 5 were followed to obtain the blocked isocyanate compounds b–g. Table 1 shows the characteristics of the blocked isocyanate compounds a–f.

TABLE 1

| Synthesis examples | | 5 | 6 | 7 | 8 | 9 | 10 |
|---|---|---|---|---|---|---|---|
| Blocked isocyanate compound | | a | b | c | d | e | f |
| Composition (g) | | | | | | | |
| Poly-isocyanate compound | MC-708S*1 | 230 | 230 | 230 | — | — | — |
| | C-2030MB*2 | — | — | — | 247 | — | — |
| | Colonate HX*3 | — | — | — | — | 199 | — |
| | Hexamethylene-diisocyanate | — | — | — | — | — | 84 |
| Active hydrogen compound | Ethylene glycol monohexyl ether | 114 (0.8) | — | — | 142 (1.0) | — | — |
| | Ethylene glycol mono-2-ethylhexyl ether | — | 87 (0.5) | — | — | — | — |
| | Diethylene glycol mono-2-ethylhexyl ether | — | — | 65 (0.3) | — | — | — |
| | ε-caprolactam | 23 (0.2) | 57 (0.5) | 80 (0.7) | — | — | — |
| | Methylethylketoxime | — | — | — | 17 (0.2) | 85 (1.0) | 85 (1.0) |
| Characteristics | Non-volatile content (%) | 70.2 | 70.3 | 69.8 | 60.2 | 80.4 | 90.0 |
| | Glass transition temperature (°C.) | 31 | 28 | 23 | 20 | −14 | −20 |
| | Solubility parameter | 10.2 | 10.9 | 10.8 | 10.3 | 12.0 | 12.7 |

*1: Diphenylmethanediisocyanate trimer (from Nippon Polyurethane Industry Co., Ltd.: NCO equivalent = 230, solid content = 60%, residual monomer content = 20%)
*2: Tolylenediisocyanate trimer (from Nippon Polyurethane Industry Co., Ltd.: NCO equivalent = 247, solid content = 60%, residual monomer content = 0.6%)
*3: Hexamethylenediisocyanate trimer (from Nippon Polyurethane Industry Co., Ltd.: NCO equivalent = 199, solid content = 100%)

Shown in the Parentheses are the equivalent ratios calculated by assuming the isocyanate equivalent in the polyisocyanate compound is 1.

Synthesis example 11 (synthesis of blocked isocyanate compound g)

A flask with a stirrer, a cooler, a nitrogen injection tube, a thermometer and a dripping funnel was used. 174 g of tolylenediisocyanate (product "Colonate T-80" from Nippon Polyurethane Industry Co., Ltd.: NCO equivalent=87), 45 g of ε-caprolactam and 112 g of methylisobutylketone were put into this flask. After adding homogeneously dissolved 0.35 g of dibutyltindilaurate and 0.35 g of 1,8-diazabicyclo(5,4,0)-7-undecene, 28 g of ethylene glycol monohexyl ether was dripped into the mixture while special attention was given to heat generation. After the dripping was completed, the temperature of the flask was kept at 60° C. and 170 g of ethylene glycol monohexyl ether was then dripped through the dripping funnel over one hour. 70 g of trimethylolpropane was then added. The reaction was continued until the absorption from the NCO group disappeared in the IR spectrum. Methylisobutylketone was then added until the non-volatile content was 70% to obtain the blocked isocyanate compound g. This blocked isocyanate compound g had a non-volatile content of 70.4% and a glass transition temperature of 8° C.

Examples 1–9, Comparative Examples 1–4

(preparation of the curing agents and the cationic electrodeposition paints)

The base resins I–III obtained in Synthesis examples 1–3 and the blocked isocyanate compounds a–g obtained in Synthesis examples 5–11 were mixed according to the ratios shown in Table 2, and ethylene glycol mono-2-ethylhexyl ether was added, the amount of which was 3% of the solid. Glacial acetic acid was then added so that the percentage of the neutralization became 40.5%. Ion-exchanged water was then added to gradually dilute the mixture. Under reduced pressure, methylisobutylketone was removed until the solid content reached 36.0%. 2000.0 g of the main emulsion thus obtained, 460.0 g of the pigment paste obtained in Synthesis example 3, 2252.0 g of ion-exchanged water and a surface control agent/hardening catalyst (dibutyltinoxide, 1 wt % of the solid) were mixed to obtain a cationic electrodeposition paint with a solid content of 20.0%.

Using the obtained cationic electrodeposition paints, electrodeposition coating was conducted at various temperatures of the electrodeposition baths on a cold-rolled steel sheet treated with zinc phosphate, and the relationship between the temperature of the electrodeposition bath and the film thickness was investigated. Electrodeposition was conducted to have a dry film thickness of 20 micrometers and 20 minutes of baking was conducted at 165° C. to obtain a hardened film. The evaluation of changes in the film thickness versus changes in the temperature of the electrodeposition bath, as well as the evaluation of the obtained film are shown in Table 2. Changes in the film thickness versus changes in the temperature of the electrodeposition bath and the hardened film were evaluated in the manner that follows.

(Electrodeposition coating temperature range)

Using MFT as a reference, this range was determined as a temperature of the electrodeposition bath range in which the film thickness variation was within ± micrometers. 10° C. or more would be a good range.

(Heating loss)

This was determined as the weight reduction percentage (%) of the coating film after 3 hours of heated drying at 105° C. and 20 minutes of baking at 220° C. The tolerance of the weight reduction percentage is less than 15%.

(Salt water spray test)

Evaluation was conducted according to JIS-Z2371. A cutter knife was used to make a cross-cut on a coated film obtained by conducting electrodeposition on a untreated cold-rolled sheet. Salt water was then sprayed at 35° C. for 480 hours, followed by evaluation of the peeled width of the edge, the peeled width with tape peeling, the rust width from the edge and the number of blisters.

o: Good

Δ: Fair

×: Bad

TABLE 2

| | | Examples | | | | | | | | | Comparative examples | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Composition (weight parts as solid) | | | | | | | | | | | | | | |
| Base resin | I | 70 | 70 | 70 | — | — | — | — | — | — | 70 | 70 | 70 | 70 |
| | II | — | — | — | 70 | 70 | — | — | — | — | — | — | — | — |
| | III | — | — | — | — | — | 70 | 70 | 60 | 80 | — | — | — | — |
| Curing agent | a | 9 | — | — | — | — | — | — | — | — | 30 | — | — | — |
| | b | — | 9 | — | — | 15 | 5 | 15 | 12 | 6 | — | — | — | — |
| | c | — | — | 9 | — | — | — | — | — | — | — | — | — | — |
| | d | — | — | — | 9 | — | — | — | — | — | — | — | — | — |
| | e | 21 | 21 | 21 | 21 | — | 25 | 15 | 28 | 14 | — | 30 | — | 15 |
| | f | — | — | — | — | 15 | — | — | — | — | — | — | — | — |
| | g | — | — | — | — | — | — | — | — | — | — | — | 30 | 15 |
| | Ratio | 3/7 | 3/7 | 3/7 | 3/7 | 5/5 | 17/83 | 5/5 | 3/7 | 3/7 | — | — | — | 5/5 |
| Evaluation results | | | | | | | | | | | | | | |
| Electrodeposition coating temperature range (°C.) | | 14 | 16 | 18 | 18 | 15 | 12 | 16 | 17 | 14 | 4 | 6 | 5 | 6 |
| Heating loss (%) | | 10.0 | 9.8 | 10.0 | 9.2 | 11.0 | 9.2 | 10.1 | 14.0 | 10.5 | 9.0 | 9.6 | 23.2 | 18.7 |
| Salt water spray test | | O | O | O | O | O | O | O | O | O | Δ | O | Δ | O |

We claim:

1. A curing agent which contains blocked isocyanate compound A and blocked isocyanate compound B, wherein the difference in the glass transition temperatures of said blocked isocyanate compound A and said blocked isocyanate compound B is at least 25° C., and the glass transition temperature of said blocked isocyanate compound A is higher than the glass transition temperature of said blocked isocyanate compound B.

2. A curing agent as described in claim 1 wherein said difference in the glass transition temperatures is about 25°–60° C.

3. A curing agent which contains blocked isocyanate compound A with a glass transition temperature of about 10°–45° C. and blocked isocyanate compound B with a glass transition temperature of −20° C.–0° C., wherein the difference in the glass transition temperatures of said blocked isocyanate compound A and said blocked isocyanate compound B is at least 25° C.

4. A curing agent as described in claim 1 for which the difference in the solubility parameters of said blocked isocyanate compound A and said blocked isocyanate compound B is 0.1–3.0.

5. A curing agent as described in claim 4 for which the solubility parameter of said blocked isocyanate compound A is about 9.5–11.5 and the solubility parameter of said blocked isocyanate compound B is about 11.6–13.5.

6. A curing agent as described in claim 5 for which the difference in said solubility parameters is about 0.6–1.5.

7. A curing agent as described in claim 1 for which said blocked isocyanate compound A is a blocked isocyanate compound derived from an aromatic polyisocyanate compound and said blocked isocyanate compound B is a blocked isocyanate compound derived from an aliphatic polyisocyanate compound.

8. A curing agent as described in claim 7 for which both said aromatic polyisocyanate compound and said aliphatic polyisocyanate compound contain an isocyanurate ring.

9. A curing agent as described in claim 8 for which said aromatic polyisocyanate compound contains an isocyanurate ring derived from tolylenediisocyanate and/or diphenylmethanediisocyanate and said aliphatic polyisocyanate compound contains an isocyanurate ring derived from hexamethylenediisocyanate.

10. A curing agent as described in claim 1 for which the weight ratio (A/B) of said blocked isocyanate compound A and said blocked isocyanate compound B is about 10/90–50/50.

11. A cationic electrodeposition coating composition which contains a base resin and a curing agent containing blocked isocyanate compound A and blocked isocyanate compound B wherein the difference in the glass transition temperatures of said blocked isocyanate compound A and said blocked isocyanate compound B is at least 25° C., and the glass transition temperature of said blocked isocyanate compound A is higher than the glass transition temperature of said blocked isocyanate compound B.

12. A cationic electrodeposition coating composition which contains a base resin and a curing agent containing blocked isocyanate compound A with a glass transition temperature of about 10°–45° C. and blocked isocyanate compound B with a glass transition temperature of about −20° C.–0° C., wherein the difference in the glass transition temperatures of said blocked isocyanate compound A and said blocked isocyanate compound B is at least 25° C.

13. A curing agent which contains blocked isocyanate compound A with a glass transition temperature of about 10°–45° C. and blocked isocyanate compound B with a glass transition temperature of about −20° to −0° C., wherein the difference in the glass transition temperatures of said blocked isocyanate compound A and said blocked isocyanate compound B is at least 25° C., and for which the solubility parameter of said blocked isocyanate compound A is about 9.5–11.5 and the solubility parameter of said blocked isocyanate compound B is about 11.6–13.5.

* * * * *